UNITED STATES PATENT OFFICE.

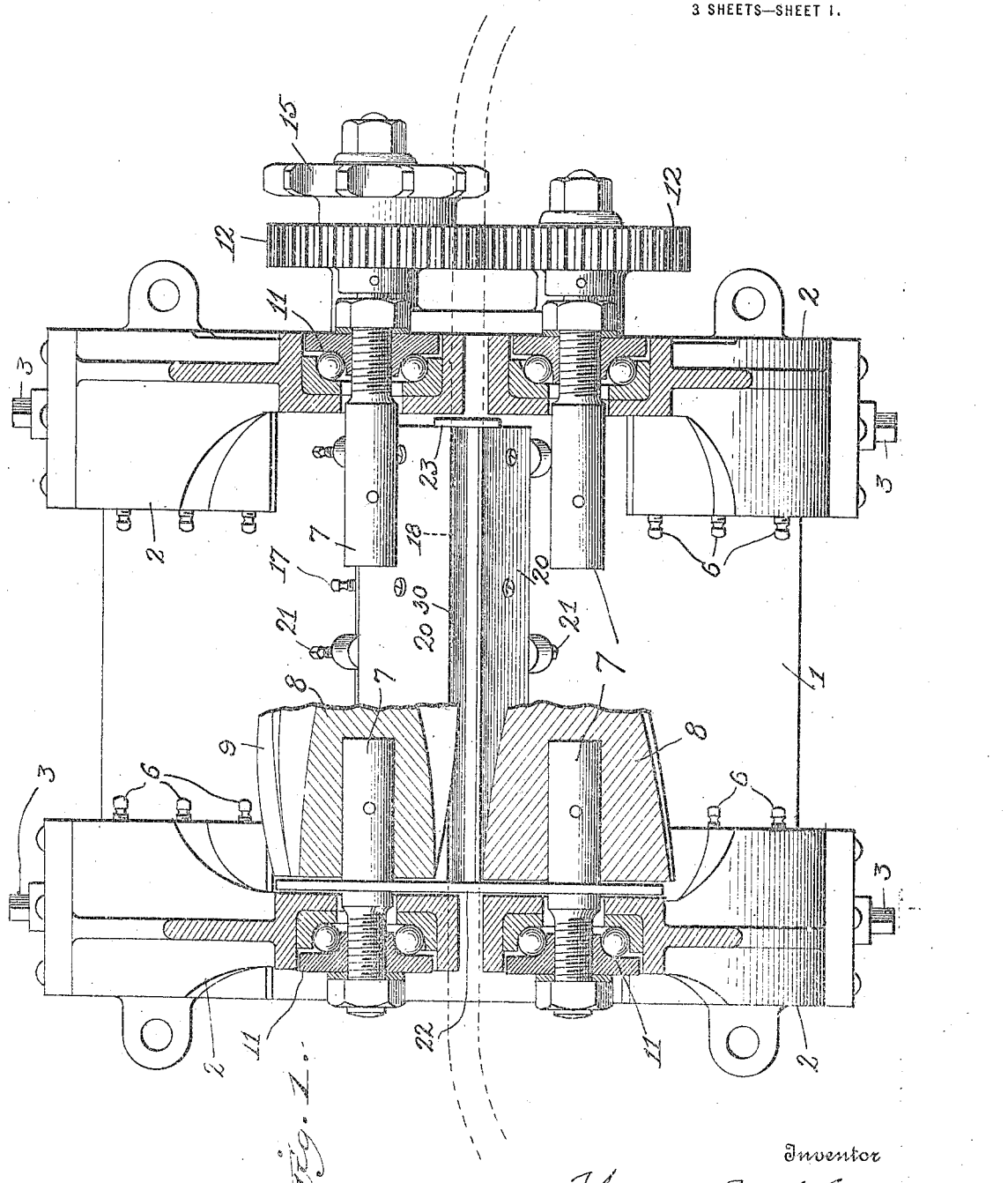

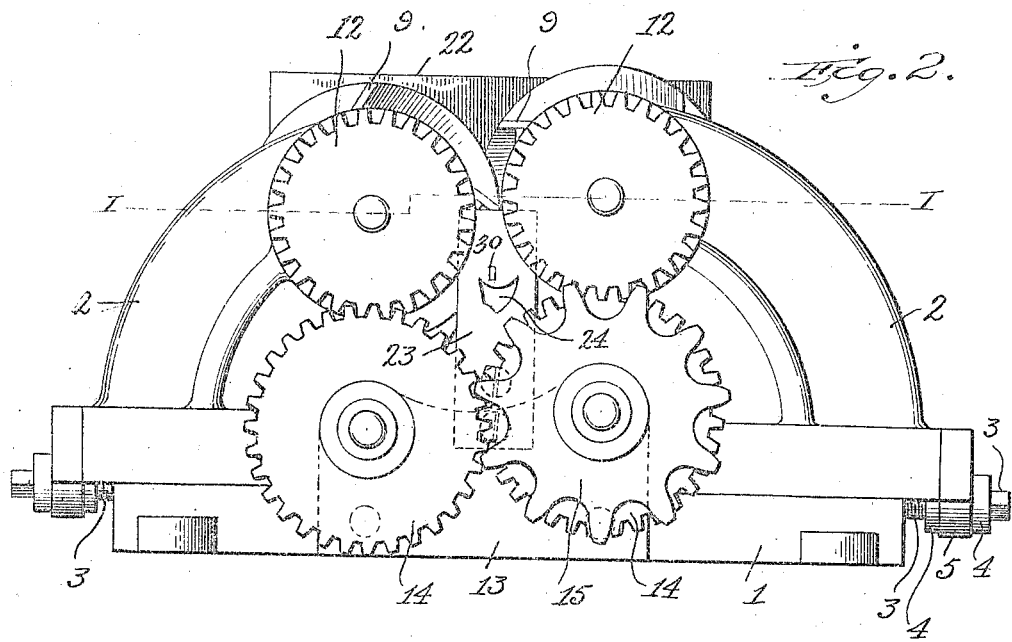

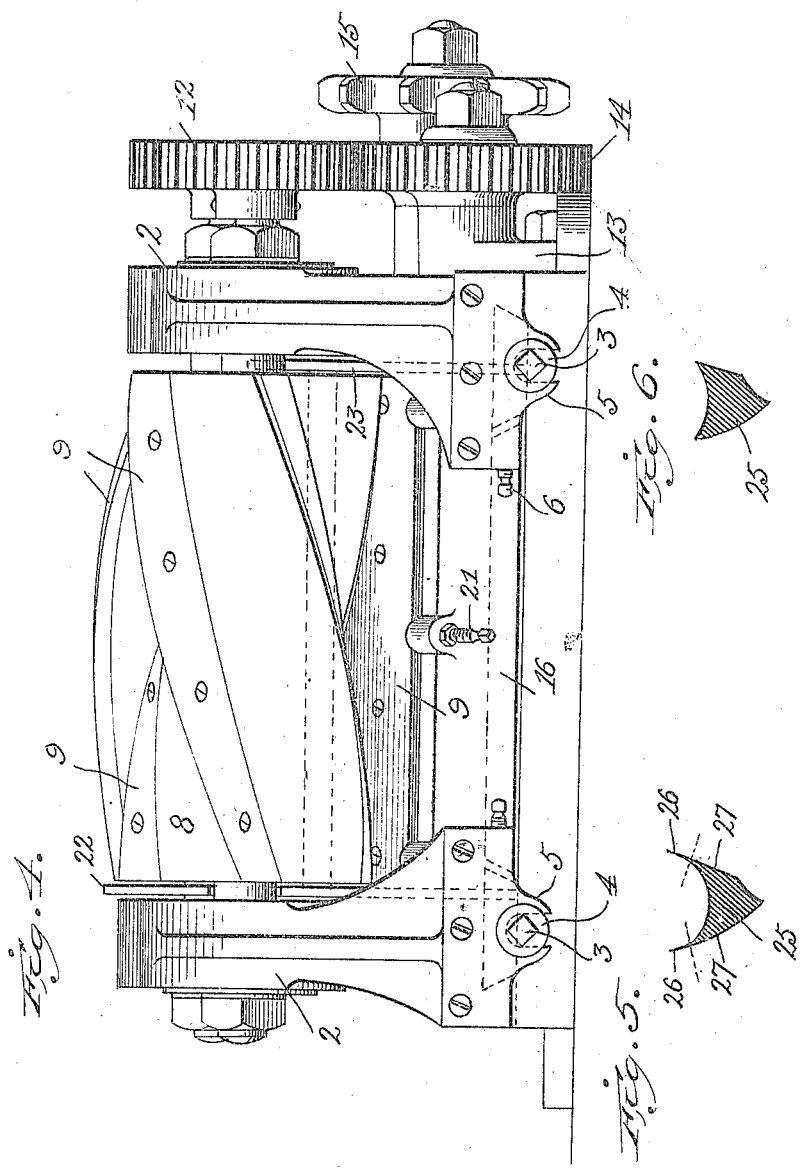

THOMAS MIDGLEY, OF DETROIT, MICHIGAN, ASSIGNOR TO MORGAN & WRIGHT, OF DETROIT, MICHIGAN, A CORPORATION OF MICHIGAN.

BEAD-TRIMMING MACHINE.

1,180,309.   Specification of Letters Patent.   Patented Apr. 25, 1916.

Application filed July 8, 1913. Serial No. 777,919.

*To all whom it may concern:*

Be it known that I, THOMAS MIDGLEY, a citizen of the United States, residing at Detroit, in the county of Wayne, State of Michigan, have invented certain new and useful Improvements in Bead-Trimming Machines; and I do hereby declare the following to be a full, clear, and exact description of the invention, such as will enable others skilled in the art to which it appertains to make and use the same.

The object of my present invention is to provide a novel machine for trimming off what is commonly known as the "flash" formed on the beads used in the manufacture of tire shoes during the molding of said beads. Said beads are formed substantially triangular in cross section, and in the molding operation of forming the same there is produced on two of the edges thereof a ragged excess of material, known as "flash" which it is necessary to trim off before the beads can be used in the manufacture of tire shoes. This trimming has been done heretofore by hand, and it is the object of the present invention to provide a machine which will expeditiously and effectually remove the same, the result being accomplished in the manner and by the means hereinafter described and claimed, reference being had to the accompanying drawings, in which:

Figure 1 is a horizontal sectional view of my improved machine, taken on the line I—I, Fig. 2. Fig. 2 is an end elevation of the discharge end of the machine. Fig. 3 is a similar view of the feed end of the machine, the same being partly broken away. Fig. 4 is a side elevation of the machine. Fig. 5 is a transverse sectional view of a piece of the bead before it is trimmed. Fig. 6 is a similar view of a piece of the bead after it has been passed through the machine and trimmed.

Similar numerals of reference denote corresponding parts in the several views.

In the said drawings the reference numeral 1 denotes the bed of the machine, which is to be fixed to any suitable supporting frame (not shown), and which has mounted adjustably thereon two pairs of curved supporting brackets 2, the same being adjustable toward and from each other by means of screws 3 having collars 4 engaging lugs 5 on said brackets and screw threaded into the base 1, as shown, suitable set-screws 6 being provided for locking said brackets in any adjusted position.

Mounted in the upper ends of the curved brackets 2 are longitudinally disposed stub shafts 7, the same being in alinement in pairs, and having keyed thereto two cutter blade carriers 8, upon each of which are mounted a plurality, preferably four, of cutter blades 9, the same being curved to effect a shearing cut, as best seen in Fig. 4. Said stub shafts are mounted preferably in ball bearings 11 of any suitable construction, and the pair at the discharge end of the machine have fixed thereto suitable drive gear wheels 12. Disposed beneath said gear wheels 12 and mounted on a bracket 13 fixed to the base 1, are two gear wheels 14, in mesh with each other, and each of them in mesh with one of said gear wheels 12, the shaft of one of said gear wheels 14 being extended and having mounted thereon a sprocket drive wheel 15 through which power is communicated to the several gear wheels to drive the same.

Disposed beneath the cutter blade carriers 8 and longitudinally of the machine is a guide block 16 for the beads to be trimmed, the same being adjustable longitudinally of the machine bed 1, suitable set screws 17 being provided to lock the same in any adjusted position. Said guide block is formed substantially triangular in cross area, and has its upper edge recessed to receive a trough-like support 18 for the bead to be trimmed, said support being adjustable vertically by means of set screws 19. The bead in this instance being of triangular cross-section, the support is preferably comprised of two converging walls 28 and 29, to adapt it to the specific configuration of the bead. Each of these walls serve a double purpose, for instance, the wall 28 acts as a backing for the bead in respect to the pair of cutters opposite this wall to suitably space the bead so that the flash will be intercepted by these cutters, and as a suitable support for the bead respecting the adjacent pair of cutters to prevent the bead from lateral movement toward said adjacent cutters. The other wall 29 acts in a similar manner as regards the pairs of cutters respectively opposite and adjacent it. The inclined sides of said block have mounted thereon cutter blades 20, vertically adjustable on said block by means of set screws 21, the inner faces of said blades forming continuations of the walls of the support 18.

Bolted to the guide block 16 at the receiving end of the machine, and disposed between the brackets 2 at that end and the ends of the cutter blade carriers 8 is a plate 22 cut out centrally as shown in Fig. 3 to conform to the shape of the bead to be trimmed, but with said cut away portion extended laterally on each side to leave room for the "flash" on the bead to pass through. At the discharge end of the machine is a plate 23, also bolted to the guide block 16, and apertured at 24 to correspond accurately with the cross area of the bead, and through which aperture the trimmed bead discharges, the line of travel of the bead being shown in dotted lines in Fig. 1.

To restrict the bead to longitudinal movement in the support, a confining bar 30 is disposed above the support extending longitudinally through the machine and having the ends reduced and secured in openings in the plates 22 and 23. The bar is spaced slightly above the path of the bead to offer no obstruction to the bead while positively preventing transverse movement of the bead.

In operation, the bead 25 to be trimmed, which is made in lengths of considerable dimension, is fed by hand into the receiving end of the machine through the aperture in the plate 22, where it passes along and is directed by the guide 18, it being understood that said bead is fed with its two edges uppermost that carry the "flash" 26 to be trimmed, in the position shown in Fig. 5, the sides 27 of said bead lying against the fixed cutter blades 20. The machine being operated to rotate the cutter blade carriers 8 toward each other with a downward cut, the cutter blades 9 thereon will, in conjunction with the fixed cutter blades 20, exert a shearing cut simultaneously upon said "flash" and will most effectually remove the same, leaving said bead in the condition shown in Fig. 6. When the trimmed end of the bead passes out of the machine the operator may continue the feed by drawing the same through the machine from that end.

The bead to be trimmed is mounted preferably upon a suitable reel or drum at the receiving end of the machine, from which it is fed, and may, if desired, be taken up mechanically by a suitable power driven receiving reel or drum located at the discharge end of the machine, though this is not essential to the effective operation of the machine.

By providing the several adjustments in the machine hereinbefore described the same is adapted to be adjusted to receive and trim beads of different sizes in cross area.

While I have shown and described the brackets 2 as adjustable transversely of the machine, the guide block 16 as adjustable longitudinally thereof, the guide 18 as adjustable vertically, and the cutter blades 20 as adjustable with respect to the angular faces of the guide block 16, all for the purpose of adapting the machine to trim beads of large or small cross areas, it will be understood that none of said adjustments are necessary if the machine is intended for use in trimming beads of one size only. Furthermore, in such event the adjustable guide 18 may be dispensed with and the top of the guide block 16 shaped to receive and fit the lower edge of the bead to be trimmed.

Having thus described my invention, what I claim as new and desire to secure by Letters Patent is:

1. In a machine for removing the flash from a bead at the juncture of two converging faces, co-acting cutters, and means positioned to co-act with one of said converging faces and a third face for supporting and positioning the bead to permit the flash to be intercepted by the cutters.

2. In a machine for removing the flash from a bead at the juncture of two converging faces, co-acting cutters, and a trough-like support for the bead, the walls of said support coacting with one of said converging faces and a third face and positioning the bead to permit the flash to be intercepted by the cutters.

3. In a machine for removing the flash from a bead at the juncture of two converging faces, co-acting cutters, and a support having a wall forming a backing for the bead opposite the cutters and having a wall to support the bead on one of said converging faces and co-acting with the first named wall in positioning the bead to permit the flash to be intercepted by the cutters.

4. In a machine for removing strips of flash from a substantially triangular bead, a trough-like support for receiving and conforming to the contour of the bead, and pairs of coacting rotary and stationary cutters positioned to operate along the edges of the support for removing the flash.

5. In a machine for removing strips of flash from a bead formed at the juncture of two converging faces, pairs of co-acting cutters, a support for the bead between the pairs of cutters, the support having a wall opposite one pair of cutters and spaced therefrom to permit a strip of flash to be intercepted by said pair, and having a wall disposed at an angle to the first named wall and opposite the other pair of cutters and spaced therefrom to permit another strip of flash to be intercepted by the second named pair of cutters.

6. In a machine for removing flash from a bead, a pair of co-acting cutters for removing the flash, a support for supporting the bead on two of its faces during the removal of the flash, and means slightly spaced from the path of a third face of the bead to prevent transverse but permit longitudinal movement of the bead on said support.

7. In a machine for removing flash from a bead, co-acting cutters for removing the flash, a support having converging walls supporting the bead during the removal of the flash, and confining means overhanging the space between said walls to prevent transverse, but permit longitudinal movement of the bead.

8. In a machine for removing flash from a bead, co-acting cutters for removing the flash, a support having converging walls supporting the bead during removal of the flash, and a confining bar extending longitudinally of said support and overhanging the space between said walls to restrict the bead to longitudinal movement.

9. In a machine for removing the flash from a bead at the juncture of two converging faces, a stationary cutter, a rotary spiral cutter co-acting with said stationary cutter to perform a shearing cut, and means disposed longitudinally of said cutters and positioned to co-act with one of said converging faces and with a third face for supporting and positioning the bead to permit the flash to be intercepted by the cutters.

In testimony whereof I have hereunto set my hand in the presence of two subscribing witnesses.

THOMAS MIDGLEY.

Witnesses:
JOHN CARLSON,
E. LA BUSEREWSKY.